(12) United States Patent
Momiyama

(10) Patent No.: US 7,104,560 B2
(45) Date of Patent: Sep. 12, 2006

(54) STABILIZER AND AIR LEAF SUSPENSION USING THE SAME

(75) Inventor: Fujio Momiyama, Yachiyo (JP)

(73) Assignee: Horikiri, Inc., Yachiyo (JP)

( * ) Notice: Subject to any disclaimer, the term of this patent is extended or adjusted under 35 U.S.C. 154(b) by 251 days.

(21) Appl. No.: 10/639,639

(22) Filed: Aug. 13, 2003

(65) Prior Publication Data

US 2004/0056398 A1 Mar. 25, 2004

(30) Foreign Application Priority Data

Sep. 10, 2002 (JP) ............................ 2002-263998

(51) Int. Cl.
*B60G 21/055* (2006.01)
(52) U.S. Cl. ...................... 280/124.107; 280/124.152; 280/124.163
(58) Field of Classification Search ......... 280/124.163, 280/124.107, 124.166, 124.137, 124.152, 280/124.149, 124.17, 93.51, 93.502, 5.511, 280/5.506; 267/273, 183, 188
See application file for complete search history.

(56) References Cited

U.S. PATENT DOCUMENTS

| | | | | |
|---|---|---|---|---|
| 1,205,612 A | * | 11/1916 | Ford ........................... 267/248 |
| 2,345,448 A | * | 3/1944 | Best ..................... 280/124.156 |
| 2,753,007 A | * | 7/1956 | Read ........................... 180/352 |
| 4,061,362 A | * | 12/1977 | Bufler .................. 280/124.106 |
| 4,153,272 A | * | 5/1979 | Fiedler et al. ......... 280/124.106 |
| 4,621,831 A | * | 11/1986 | Takadera et al. ....... 280/124.106 |
| 4,784,406 A | * | 11/1988 | Stinson ............... 280/124.154 |
| 4,886,292 A | * | 12/1989 | Azamatov et al. .......... 280/680 |
| 5,549,321 A | * | 8/1996 | Novak et al. .......... 280/124.107 |
| 6,076,840 A | * | 6/2000 | Kincaid et al. ........ 280/124.107 |
| 6,406,007 B1 | * | 6/2002 | Wilson ....................... 267/36.1 |

FOREIGN PATENT DOCUMENTS

| JP | 2000289426 A | * | 10/2000 |
|---|---|---|---|
| JP | 2003-267019 | | 9/2003 |
| JP | 2003-267020 | | 9/2003 |

* cited by examiner

*Primary Examiner*—David R. Dunn
(74) *Attorney, Agent, or Firm*—Oblon, Spivak, McClelland, Maier & Neustadt, P.C.

(57) ABSTRACT

Disclosed are a stabilizer with conventionally unattainable, extreme swift effectiveness and an air leaf suspension using the stabilizer. The stabilizer has a stabilizer bar 18 which is U-shaped when seeing from above and which has a portion 18a laterally extending along and rotatably connected to an axle 3, and a pair of upwardly convergent stabilizer links 19 which connect opposite longitudinally extending ends of the stabilizer bar to a chassis frame side above them.

5 Claims, 4 Drawing Sheets

TUNED SIDE ← → SIDE AWAY FROM TUNED SIDE

TUNED SIDE ← → SIDE AWAY FROM TUNED SIDE

TUNED SIDE ←      SIDE AWAY FROM TUNED SIDE →

STABILIZER AND AIR LEAF SUSPENSION USING THE SAME

CROSS-REFRENCE TO RELATED APPLICATION

This application is related to and claims priority, under 35 U.S.C. § 119, from Japanese Patent Application No. 2002-263998, filed in the Japanese Patent Office on Sep. 10, 2002, the entire contents of which is hereby incorporated by reference herein.

BACKGROUND OF THE INVENTION

1. Field of the Invention

The present invention relates to a stabilizer and a leaf suspension using the same.

2. Discussion of Background

There are various suspensions for hanging axles from chassis frames. Among them, a leaf suspension with layered leaf springs has been widely used for vehicles such as trucks since it is of simple structure, less expensive, superior in strength and highly durable.

FIG. 1 shows an example of such leaf suspension in which reference numerals 1 denote a pair of opposite, side rails which extend longitudinally of a vehicle and form parts of a chassis frame; 2, two-layered leaf springs extending along the side rails 1; and 3, an axle in the form of an I-beam connected, through U-shaped bolts 4, to lower surfaces of longitudinally intermediate portions of the leaf springs 2.

A front end of the leaf spring 2 is upwardly wound into an eye 5 which is rockably wound around a horizontal pin 7 on a front bracket 6 of the side rail 1.

A rear end of the leaf spring 2 is upwardly wound into an eye 8 which is rockably wound around a horizontal pin 11 on a shackle 10 of a rear bracket 9 of the side rail 1. Thus, longitudinal expansion and contraction of the leaf springs 2 due to bow-shaped bending of the same are absorbed by rocking the shackles 10.

It is, however, an undeniable fact that such conventional leaf suspension is inferior in riding comfortability of a vehicle to the other existing air suspensions. Therefore, a proposal has been made to improve riding comfortability by interposing air springs 12 between the side rails 1 and upper surfaces of the longitudinally intermediate portions of the leaf springs 12 as shown in FIG. 2.

As to the leaf suspension, inventions of the inventor have been filed, for example, in Japanese Patent Application No. 2002-74857.

In the example shown, brackets 13 are also secured to the portions of the leaf springs 2 where the axle 3 is carried. Rockably fitted to front ends of the brackets 13 are opposite ends 14b of a stabilizer bar 14 which is U-shaped when seeing from above. A laterally extending portion 14a of the stabilizer bar 14 is connected on its two points to a cross member (not shown) between the side rails 1 (see FIG. 1) through a pair of vertically extending stabilizer links 15.

This kind of stabilizer structure itself is well-known in the art. When laterally opposite wheels of the vehicle are concurrently vertically moved, the stabilizer bar 14 is merely laterally uniformly rocked; however, when the wheels are differently vertically moved in the case of, for example, cornering, torsion moment acts on the stabilizer bar 14 and a reaction force thereto causes the wheels to return to their original positions, which is called anti-rolling effect.

In FIG. 2, reference numeral 16 denote mount rubbers for the stabilizer links 15; and 17, brake drums over which the wheels (not shown) are fitted.

In the case of the above-mentioned air leaf suspension using both the leaf springs 2 and the air springs 12, in order to improve the riding comfortability of the vehicle to an extent competitive to those of the existing expensive air suspensions, a pair of leaf springs made of high-strength steel with toughness and with extremely reduced thickness are to be provided so as to attain low rate of spring constant while the air springs 12 are to be larger-sized to give added weight to effectiveness of the air springs 12; however, such improvement in riding comfortability is also accompanied with lowered lateral rigidity of the suspension, resulting in a new problem that rolling of the chassis tends to occur.

More specifically, the lowered lateral rigidity of the suspension causes the chassis to be readily laterally displaced when a centrifugal force acts on the chassis at a side away from the turned side of the chassis at cornering, which increases deviation of the center of gravity of the chassis, resulting in the chassis being readily rolled.

The present invention was made in view of the above and has its object to provide a stabilizer which has swift effectiveness unobtainable in the prior art and affords anti-rolling force instantly in response to any lateral displacement of the chassis and to realize an air leaf suspension using this stabilizer and with lightness in weight, cheapness and improved riding comfortability.

BRIEF SUMMARY OF THE INVENTION

The present invention provides a stabilizer comprising a stabilizer bar which is U-shaped when seeing from above and which has a portion laterally extending along and rotatably connected to an axle, and a pair of upwardly convergent stabilizer links for connecting opposite longitudinally extending ends of the stabilizer bar to a chassis frame side thereabove.

With the stabilizer thus constructed, when the centrifugal force acts on the side away from the turned side at cornering and the chassis begins to be laterally displaced, one of the laterally inwardly tilted stabilizer links which is away from the turned side becomes less tilted whereas the other stabilizer link at the turned side becomes further tilted laterally inwardly. As a result, with respect to the chassis being laterally displaced, one and the other ends of the stabilizer bar away from and at the turned side are forced down and up, respectively.

Thus, mere lateral displacement of the chassis causes torsion moment to act on the stabilizer bar before occurrence of rolling of the chassis, and a reaction force thereagainst produces anti-rolling force.

As a result, obtained is conventionally unattainable, extreme swift effectiveness of the stabilizer. Rolling of the chassis is efficiently suppressed by applying anti-rolling force on the chassis before occurrence of great rolling of the chassis. Thus, according to the invention, driving stability at cornering is substantially improved in comparison with conventional stabilizers where greater anti-rolling force acts on the chassis after occurrence of great rolling of the chassis.

Since the stabilizer links are arranged upwardly convergently according to the invention, center lines of the stabilizer links are crossed at a higher position which becomes a rolling center of the chassis so that shortened is distance between the center of rolling and the center of gravity of the vehicle. Such shortened distance also has an effect of suppressing the occurrence of rolling moment.

In the stabilizer according to the invention, the stabilizer bar may be made of a U-shaped pipe with opposite reduced-diameter ends over which lower ends of the stabilizer links may be fitted via rubber bushes and secured thereto by snap rings for prevention of slip-off, which enables the stabilizer bar as the main component to be provided by a hollow pipe. As a result, the stabilizer can be substantially reduced in weight and produced with less cost since the constituent parts are inexpensive and fewer in number.

The present invention further relates to an air leaf suspension which comprises an axle with the above-mentioned stabilizer, a pair of laterally opposite and longitudinally extending leaf springs, the axle being connected to lower surfaces of longitudinally intermediate portions of the leaf springs, each of the leaf springs having longitudinally opposite ends mounted to side rails, and air springs interposed between the respective side rails and upper surfaces of the longitudinally intermediate portion of the leaf spring.

With such air leaf suspension thus constructed, the stabilizer used has swift effectiveness unobtainable in the prior art and can attain both the riding comportability of the vehicle due to lowered spring constant and excellent anti-rolling performance, so that an air leaf suspension can be obtained which is light in weight, less expensive and has improved riding comportability.

Next, a preferred embodiment of the invention will be described in conjunction with the drawings.

DETAILED DESCRIPTION OF THE PREFERRED EMBODIMENT

Figure 1:
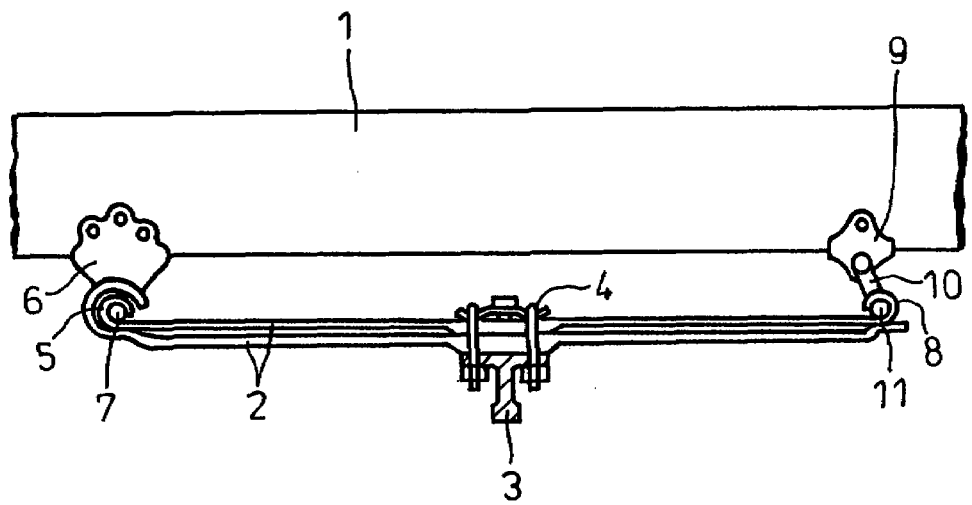
FIG. 1 is a side view showing a conventional stabilizer.
Figure 2:
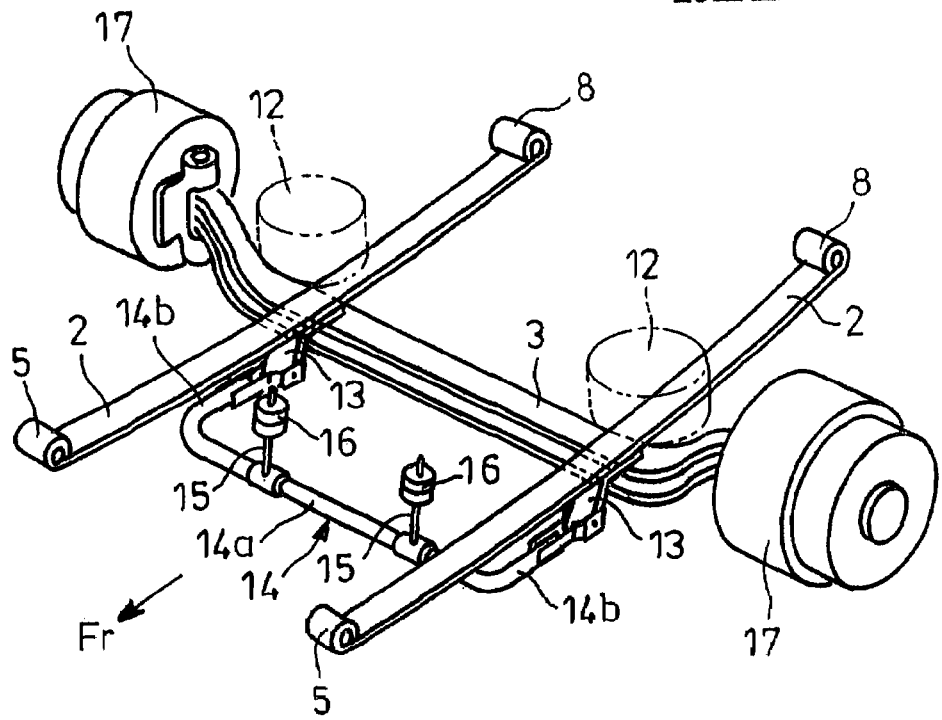
FIG. 2 is a perspective view showing a further conventional stabilizer.

FIGS. 3 to 7 show an embodiment of the invention in which parts similar to those in FIGS. 1 and 2 are represented by the same reference numerals.

Figure 3:
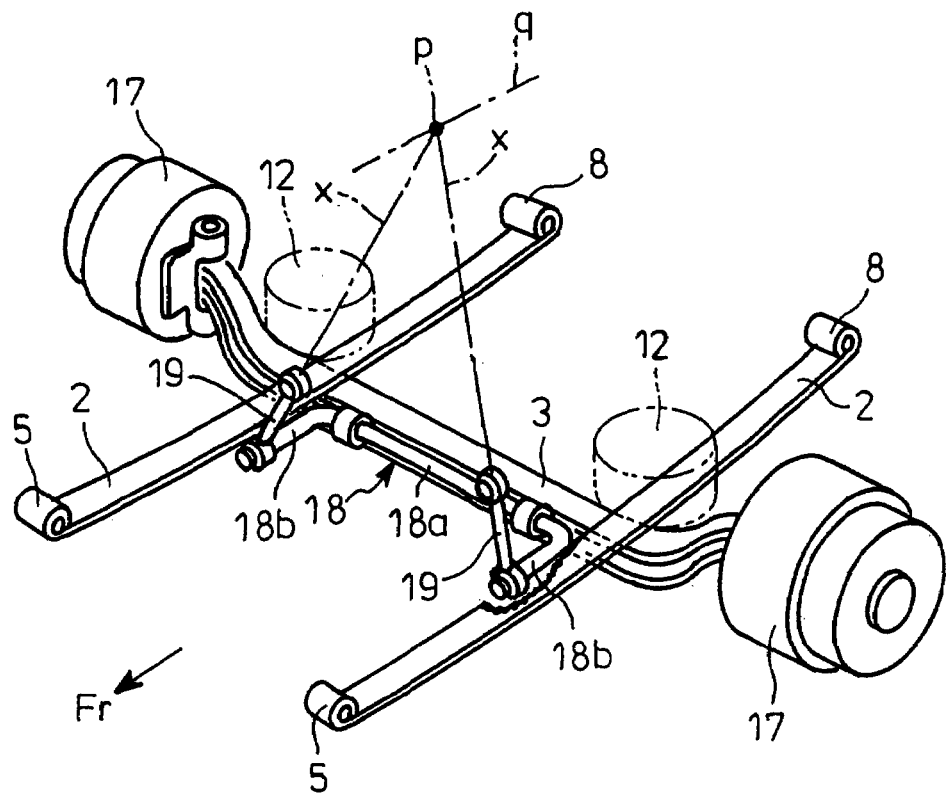
FIG. 3 is a perspective view showing an embodiment of the invention.

As best shown in FIG. 3, the embodiment applied is an air leaf suspension with leaf and air springs in combination substantially similar to that shown in FIG. 2. More specifically, the stabilizer of FIG. 2 is substituted by a stabilizer detailed hereinafter.

A portion 18a of an stabilizer bar 18 which is U-shaped when seeing from above extends along and is rotatably fitted to an axle 3. Forwardly protruded longitudinal ends 18b of the stabilizer bars 18 are connected to the respective side rails 1 thereabove (see FIG. 5) via a pair of upwardly convergent stabilizer links 19.

Extension center lines x of the stabilizer links 19 are crossed together at a laterally intermediate higher position p through which an axis q of rolling passes longitudinally of the vehicle.

Figure 4:
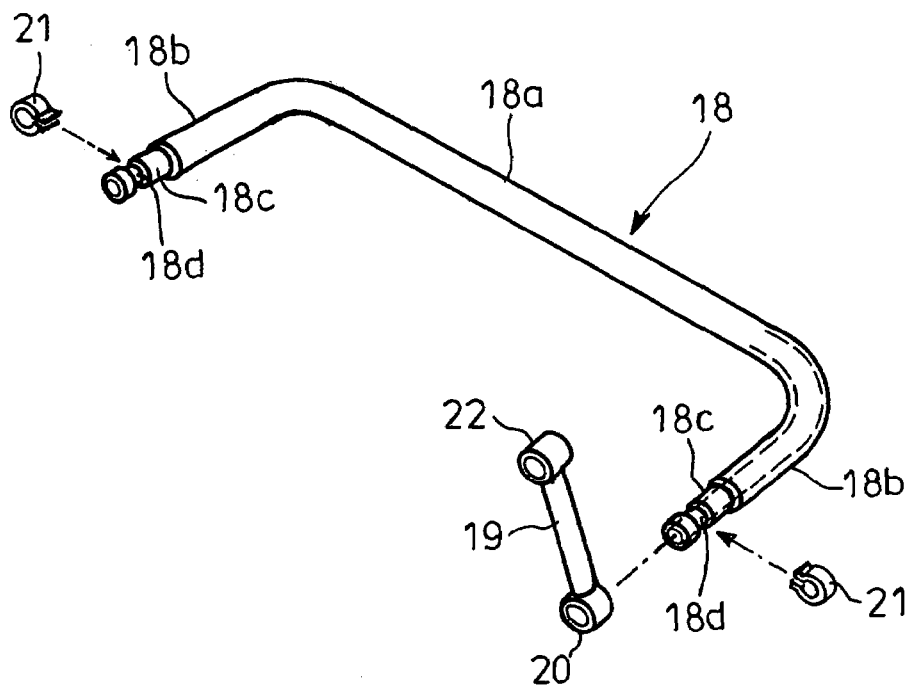
FIG. 4 is an exploded perspective view showing details of the stabilizer bar shown in FIG. 3.

As shown in FIG. 4, the stabilizer bar 18 is made of a U-shaped pipe having opposite longitudinal end portions 18b with reduced-diameter ends 18c over which lower ends of the stabilizer links 19 are fitted through rubber bushes 20. The respective reduced-diameter ends 18c have terminal annular grooves 18d into which snap rings 21 are fitted so as to prevent the lower ends of the stabilizer links 19 from being slipped off.

Upper ends of the stabilizer links 19 are fitted to, for example, brackets (not shown) on the side rail 1 (see FIG. 5) side via rubber bushes 22.

Figure 5:
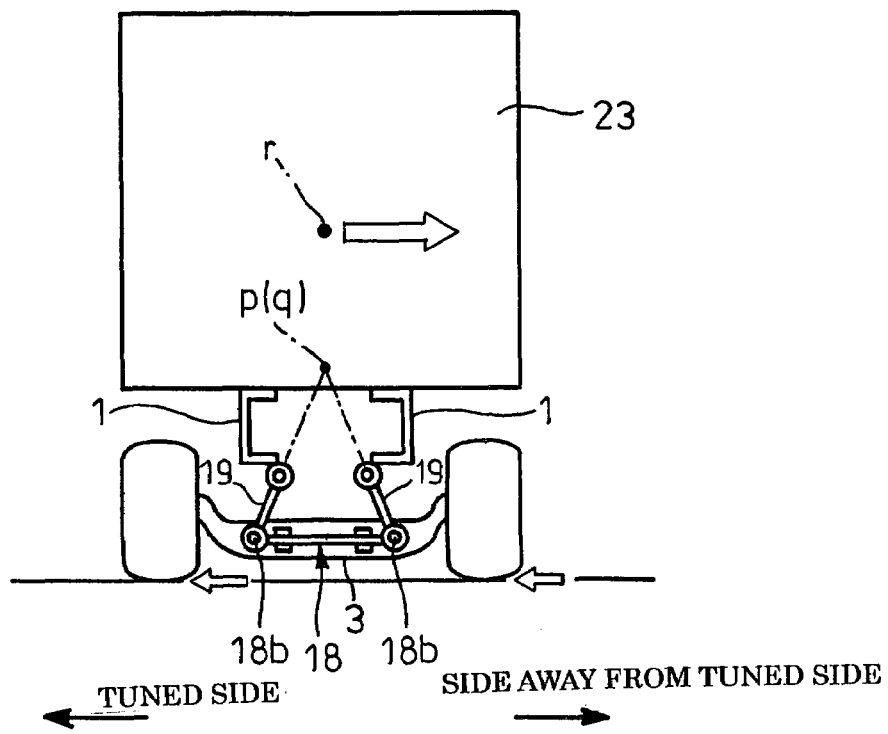
FIGS. 5, 6 and 7 are schematic views showing initial, intermediate and late operation phases of the embodiment, respectively, at cornering.
Figure 6:
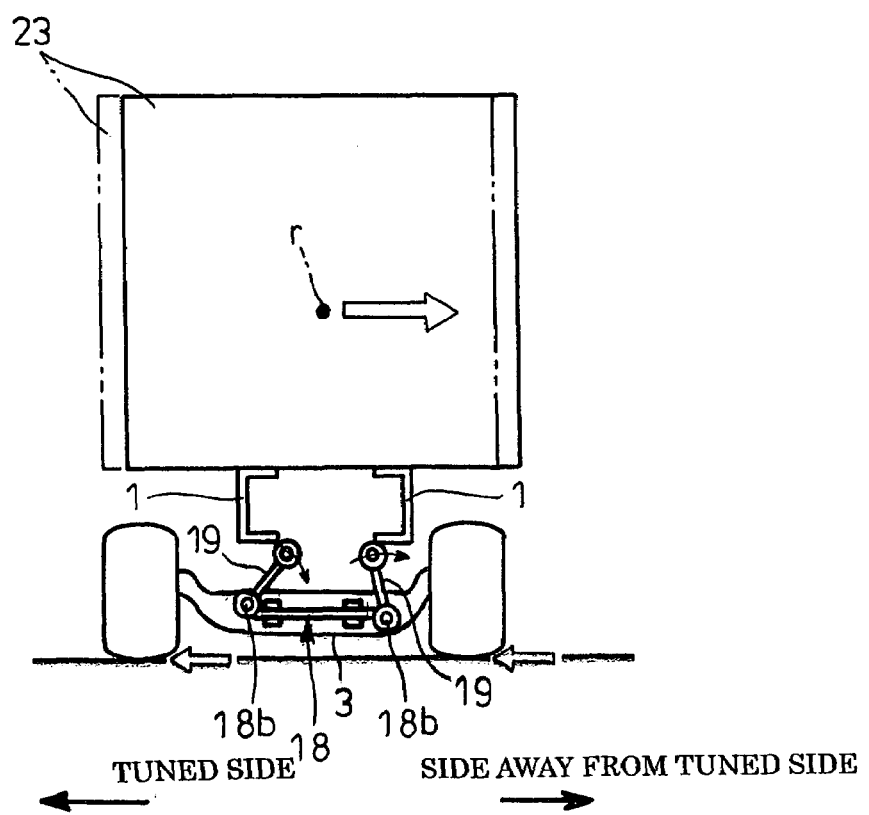
Figure 7:
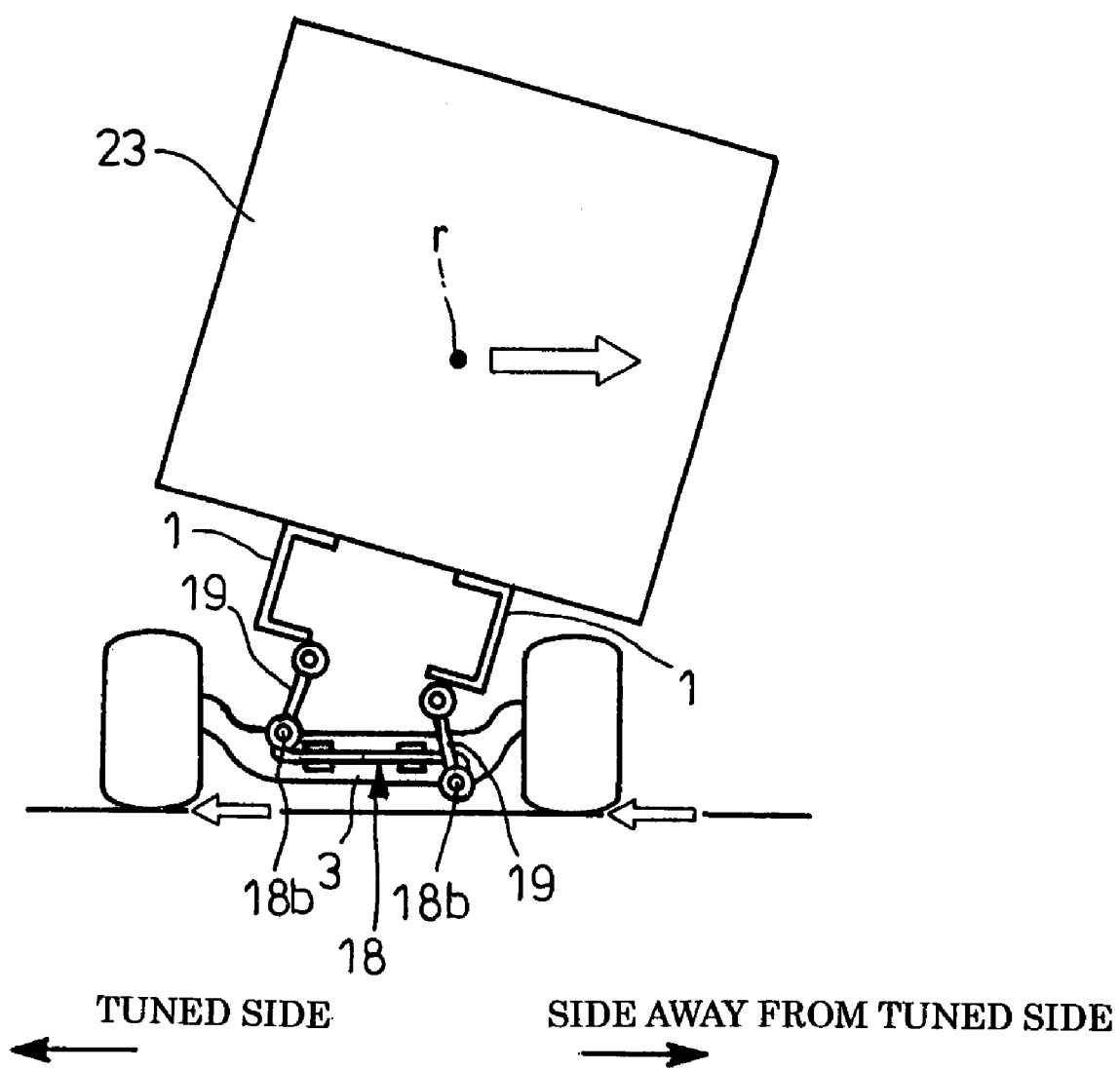

Thus, when a centrifugal force acts on the side of the chassis 23 away from the turned side and the chassis 23 begins to be laterally displaced as shown in FIG. 5, the stabilizer link 19 away from the turned side or at the right in FIG. 6 becomes less tilted whereas the stabilizer link 19 at the turned side or at the left in FIG. 6 becomes further tilted laterally inwardly. As a result, with respect to the chassis 23 being laterally displaced, the end portions 18b of the stabilizer bar 18 away from and at the turned side are forced down and up, respectively.

More specifically, mere lateral displacement of the chassis 23 causes torsion moment to act on the stabilizer bar 18 before occurrence of rolling of the chassis 23, and an reaction force thereagainst produces an anti-rolling force.

As a result, obtained is conventionally unattainable, extreme swift effectiveness of the stabilizer. Rolling of the chassis 23 is efficiently suppressed by applying anti-rolling force on the chassis before occurrence of great rolling of the chassis 23 (see FIG. 7). Thus, according to the invention, driving stability at cornering is substantially improved in comparison with conventional stabilizers where greater anti-rolling force acts on a chassis after occurrence of great rolling of the chassis.

Since the stabilizer links 19 are arranged upwardly convergently, the axis q of rolling of the chassis 23 is at a higher position so that shortened is distance between the axis q of rolling and the center r of gravity of the vehicle. Such shortened distance also has an effect of suppressing the occurrence of rolling moment.

Thus, in accordance with the above-mentioned embodiment, the stabilizer with conventionally unattainable, extreme swift effectiveness can be obtained which affords anti-rolling force instantly in response to any lateral displacement of the chassis. Driving stability at cornering can be substantially improved in comparison with conventional stabilizers.

Application of such stabilizer with swift effectiveness to an air leaf suspension can bring about both the riding comportability of a vehicle due to lowered spring constant and excellent anti-rolling performance, so that an air leaf suspension can be attained which is light in weight, less expensive and has improved riding comportability.

Especially in the case of the embodiment, the main component or stabilizer bar 18 is provided by a hollow pipe so that the stabilizer can be substantially reduced in weight and produced with less cost since the constituent parts are inexpensive and fewer in number.

It is to be understood that the stabilizer and the air leaf suspension using the same according to the invention are not limited to the above embodiment and that various changes and modifications may be made without departing from the scope and spirit of the invention. For example, a combination of leaf springs with a stabilizer and without air springs may be applicable.

The invention claimed is:

1. A stabilizer comprising a stabilizer bar which is U-shaped when seen from above and which has a portion laterally extending along and rotatably connected to an axle, and a pair of upwardly convergent stabilizer links, each having lower portions pivotally connected to respective opposite longitudinally extending ends of the stabilizer bar and each having upper portions connected to a chassis frame side thereabove such that the upper portion of a respective one of said stabilizer links can move laterally with respect to the axle.

2. The stabilizer as claimed in claim 1 wherein the stabilizer bar is made of a U-shaped pipe with opposite smaller-diameter ends over which lower ends of the stabilizer links are pivotally fitted via rubber bushes and secured thereto by snap rings for prevention of slip-off.

3. An air leaf suspension comprising an axle with a stabilizer as claimed in claim 1, a pair of laterally opposite and longitudinally extending leaf springs, the axle being connected to lower surfaces of longitudinally intermediate portions of the leaf springs, each of the leaf springs having longitudinally opposite ends mounted to side rails, and air springs interposed between the respective side rails and upper surfaces of the longitudinally intermediate portion of the leaf springs.

4. An air leaf suspension comprising an axle with a stabilizer as claimed in claim 2, a pair of laterally opposite and longitudinally extending leaf springs, the axle being connected to bottoms of longitudinally intermediate portions of the leaf springs, each of the leaf springs having longitudinally opposite ends mounted to side rails, and air springs interposed between the respective side rails and upper surfaces of the longitudinally intermediate portion of the leaf springs.

5. An air leaf suspension in a vehicle having frame members, comprising:
   an elongated axle;
   a pair of elongated leaf springs provided at locations spaced along the length of the axle, wherein the axle is connected to a longitudinally intermediate portion of each of said leaf springs, and wherein longitudinally opposite ends of each of the leaf springs are mounted to one of the frame members;
   air springs interposed between respective ones of the frame members and upper surfaces of the longitudinally intermediate portions of the leaf springs;
   a stabilizer bar having a generally U-shape including two opposite ends and a mid-portion between said opposite ends of the stabilizer bar, wherein the mid-portion is pivotally connected to said axle and extends generally parallel to the length of said axle; and
   a pair of elongated stabilizer links, wherein a lower portion of each of said stabilizer links is pivotally connected to a respective one of the opposite ends of the stabilizer bar and an upper portion of each of said links is connected to a respective one of the frame members above the stabilizer bar, wherein the pivotal connection of the respective lower portion of each of said stabilizer links to the respective one of the opposite ends of the stabilizer bar is arranged such that the upper portion of a respective one of said stabilizer links can move laterally with respect to the axle, and wherein the stabilizer links are inwardly convergent such that extension lines of each of the stabilizer links cross above and between the stabilizer links.

\* \* \* \* \*